US012384145B2

(12) United States Patent
Lean et al.

(10) Patent No.: US 12,384,145 B2
(45) Date of Patent: *Aug. 12, 2025

(54) PRINTED OUTPUT OF DIGITAL PRINTING SYSTEMS

(71) Applicant: LANDA CORPORATION LTD., Rehovot (IL)

(72) Inventors: Avshalom Lean, Hod Hasharon (IL); Ittai Wiener, Mevaseret Zion (IL); Matan Bar-On, Hod Hasharon (IL)

(73) Assignee: LANDA CORPORATION LTD., Rehovot (IL)

( * ) Notice: Subject to any disclaimer, the term of this patent is extended or adjusted under 35 U.S.C. 154(b) by 398 days.

This patent is subject to a terminal disclaimer.

(21) Appl. No.: 17/750,370

(22) Filed: May 22, 2022

(65) Prior Publication Data

US 2022/0388300 A1 Dec. 8, 2022

Related U.S. Application Data

(63) Continuation of application No. 17/290,279, filed as application No. PCT/IB2019/059420 on Nov. 2, 2019, now Pat. No. 11,370,217.

(Continued)

(51) Int. Cl.

*B41J 2/005* (2006.01)
*B41F 21/05* (2006.01)

(Continued)

(52) U.S. Cl.

CPC ............. *B41J 2/0057* (2013.01); *B41F 21/05* (2013.01); *B41J 13/223* (2013.01); *B41J 2002/012* (2013.01)

(58) Field of Classification Search

CPC ... B41J 2/01; B41J 2/211; B41J 2/1433; B41J 2/17; B41J 2/17593; B41J 2/2107;

(Continued)

(56) References Cited

U.S. PATENT DOCUMENTS 3,650,211 A 3/1972 Nentwich
5,019,860 A * 5/1991 Matsuo .................. G03F 7/343 355/85

(Continued)

FOREIGN PATENT DOCUMENTS

CN 1077681 A 10/1993
CN 101352958 A 1/2009

(Continued)

OTHER PUBLICATIONS

JPH11198342A Machine Translation (by Google Patents)—published Jul. 27, 1999; Mitsubishi Heavy Ind Ltd.

(Continued)

*Primary Examiner* — Manish S Shah
(74) *Attorney, Agent, or Firm* — Momentum IP; Marc Van Dyke

(57) ABSTRACT

An impression station of a printing system comprises a rotatable impression cylinder with an impression cylinder gap housing a plurality of grippers recessed therein. A pressure cylinder assembly comprises a pressure cylinder comprising a pressure cylinder gap and an angle portion joining a trailing edge of the pressure cylinder gap and an outer circumferential surface of the pressure cylinder. A compressible blanket is disposed around the circumference of the pressure cylinder. A margin insert is interposed between the pressure cylinder and the compressible blanket at least at the angle portion, such that a local external geometry of the pressure cylinder assembly at the angle portion is changed by the presence of the margin insert. The change in the local external geometry of the pressure cylinder assembly due to the presence of the margin insert is effective to reduce a dimension of an unprinted leading-edge margin.

21 Claims, 9 Drawing Sheets

Related U.S. Application Data

(60) Provisional application No. 62/768,941, filed on Nov. 18, 2018.

(51) Int. Cl.
*B41J 2/01* (2006.01)
*B41J 13/22* (2006.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436
See application file for complete search history.

(56) References Cited

U.S. PATENT DOCUMENTS

| | | | | | |
|---|---|---|---|---|---|
| 5,029,525 | A | | 7/1991 | Jeschke | |
| 5,408,297 | A | * | 4/1995 | Matsuo | G03F 3/102 101/415.1 |
| 5,473,407 | A | * | 12/1995 | Fuchioka | H04N 1/08 101/415.1 |
| 5,555,812 | A | | 9/1996 | Ruckmann et al. | |
| 5,678,486 | A | | 10/1997 | Bachmeir et al. | |
| 2005/0150408 | A1 | * | 7/2005 | Hesterman | G03G 15/6555 101/409 |
| 2010/0282101 | A1 | * | 11/2010 | Masuda | B41F 21/10 101/232 |
| 2015/0022602 | A1 | * | 1/2015 | Landa | B41J 11/0021 347/102 |
| 2022/0153014 | A1 | | 5/2022 | Landa | |

FOREIGN PATENT DOCUMENTS

| | | | |
|---|---|---|---|
| CN | 101578179 | A | 11/2009 |
| CN | 204184059 | U | 3/2015 |
| CN | 108472825 | A | 8/2018 |
| JP | S6072241 | U | 5/1985 |
| JP | H11198342 | A | 7/1999 |
| WO | 9942290 | A1 | 8/1999 |

OTHER PUBLICATIONS

JPS6072241U Machine Translation (by Google Patents)—published May 21, 1985; Toru Hashido et al.
CN101352958A Machine Translation (by EPO and Google)—published Jan. 28, 2009; Jianping Shen.
CN101578179A Machine Translation (by EPO and Google)—published Nov. 11, 2009; Komori Printing Mach.
CN1077681A Machine Translation (by EPO and Google)—published Oct. 27, 1993; Heidelberger Druckmasch AG [DE].
CN108472825A Machine Translation (by EPO and Google)—published Aug. 31, 2018; Koenig & Bauer AG.
CN204184059U Machine Translation (by EPO and Google)—published Mar. 4, 2015; Riso Kagaku Corp.

* cited by examiner

PRINTED OUTPUT OF DIGITAL PRINTING SYSTEMS

CROSS-REFERENCE TO RELATED APPLICATIONS

PCT/IB2019/059420, which was filed on Nov. 2, 2019, is incorporated herein by reference in its entirety. PCT/IB2019/059420 claims the benefit of U.S. Provisional Patent Application No. 62768941 filed on Nov. 18, 2018, which is incorporated herein by reference in its entirety.

FIELD OF THE INVENTION

The present invention relates to systems and methods for improving the printed output produced by a digital printing system that uses an intermediate transfer medium comprising a flexible belt. In particular, the present invention is suitable for reducing leading-edge margins of images transferred to substrate in such printing systems.

BACKGROUND

Printing devices can use an indirect inkjet printing process in which an inkjet print head is used to deposit ink droplets forming an ink image onto the surface of an intermediate transfer member, which is then used to transfer the image onto a substrate. The intermediate transfer member (ITM) may be a flexible belt. To reduce the possibility of damage or excessive wear to the ITM as it traverses an image transfer station, or impression station, the grippers of an impression cylinder may be recessed. Operating with grippers recessed within an impression cylinder gap may require a change in the geometry of the surface of the impression cylinder in order to avoid creasing or wrinkling of substrate, and this change may result in an undesirable expansion of a leading-edge unprinted margin of ink images transferred to substrate.

SUMMARY

The present disclosure relates to digital printing systems. In embodiments, a printing system comprises an intermediate transfer member (ITM) comprising a flexible belt operable to have ink images formed thereupon by droplet deposition at an image-forming station; and an impression station configured for transfer of the ink images to substrate after they are conveyed to the impression station by the ITM, the impression station comprising: (i) a rotatable impression cylinder having an impression cylinder gap housing a plurality of grippers substantially recessed therein, and a (ii) pressure cylinder assembly comprising: (A) a pressure cylinder having a pressure cylinder gap and operative to rotate synchronously with the impression cylinder and in an opposing direction thereto, the pressure cylinder comprising an angle portion joining a trailing edge of the pressure cylinder gap and an outer circumferential surface of the pressure cylinder, (B) a compressible blanket disposed around at least a majority of the circumference of the pressure cylinder, and (C) a margin insert interposed between the pressure cylinder and the compressible blanket at least at the angle portion, such that a local external geometry of the pressure cylinder assembly at the angle portion is changed by the presence of the margin insert, wherein the change in the local external geometry of the pressure cylinder assembly due to the presence of the margin insert is effective to reduce a dimension of an Imprinted margin on a leading edge of the substrate.

In some embodiments, the pressure cylinder assembly can additionally comprise (D) a packing sheet disposed around at least a majority of the circumference of the pressure cylinder, interposed between the pressure cylinder and the compressible blanket, such that the margin insert is interposed between the packing sheet and the compressible blanket.

In some embodiments, the pressure cylinder assembly can additionally comprise (D) a packing sheet disposed around at least a majority of the circumference of the pressure cylinder, interposed between the pressure cylinder and the compressible blanket, such that the margin insert is interposed between the pressure cylinder and the packing sheet.

In some embodiments, it can be that (i) a surface of the impression cylinder comprises a deflected portion displaced circumferentially from the grippers, and (ii) during each rotation of the impression cylinder, transfer of an ink image from the ITM to the substrate starts at a first transfer point on the surface of the impression cylinder located between the grippers and the deflected portion.

In some embodiments, the local external geometry of the pressure cylinder assembly at the angle portion can be determined at least in part by the thickness and location of the margin insert.

In some embodiments, the distance between the grippers and the first transfer point can be determined at least in part by the thickness and location of the margin insert.

In some embodiments, the deflected portion can include a deflection in the surface of the impression cylinder, the deflection having an angle selected so as to cause the portion of said surface between the deflected portion and the grippers to be substantially lined up with an upper surface of a gripper anvil.

In some embodiments, the margin insert can be disposed around no more than 10% of the circumference of the pressure cylinder.

In some embodiments, the margin insert can be disposed around no more than 5% of the circumference of the pressure cylinder.

In embodiments, a printing system comprises an impression station configured for transfer of ink images from an intermediate transfer member (ITM) to substrate, the ITM comprising a flexible belt, the impression station comprising: (i) a rotatable impression cylinder having an impression cylinder gap housing a plurality of grippers substantially recessed therein, a surface of the impression cylinder comprising a deflected portion displaced circumferentially from the grippers, such that during the transferring, a leading edge of the ink image is aligned with a first transfer point on the surface of the impression cylinder between the grippers and the deflected portion, and (ii) a pressure cylinder assembly comprising (A) a pressure cylinder having a pressure cylinder gap and operative to rotate synchronously with the impression cylinder and in an opposing direction thereto, (B) a compressible blanket disposed around at least a majority of the circumference of the pressure cylinder, and (C) a margin insert interposed between the impression cylinder and the compressible blanket, the presence of the margin insert being effective to reduce the distance between the grippers and the first transfer point.

In some embodiments, the pressure cylinder assembly can additionally comprise (D) a packing sheet disposed around at least a majority of the circumference of the pressure cylinder, interposed between the pressure cylinder and the compressible blanket, such that the margin insert is interposed between the packing sheet and the compressible blanket.

In some embodiments, the pressure cylinder assembly can additionally comprise (D) a packing sheet disposed around at least a majority of the circumference of the pressure cylinder, interposed between the pressure cylinder and the compressible blanket, such that the margin insert is interposed between the pressure cylinder and the packing sheet and the compressible blanket.

In some embodiments, it can be that (i) the pressure cylinder comprises an angle portion joining a trailing edge of the pressure cylinder gap and an outer circumferential surface of the pressure cylinder, and (ii) the local external geometry of the pressure cylinder assembly at the angle portion is determined at least in part by the thickness and location of the margin insert.

In some embodiments, the distance between the grippers and the first transfer point can be determined at least in part by the thickness and location of the margin insert.

In some embodiments, the deflected portion can include a deflection in the surface of the impression cylinder, the deflection having an angle selected so as to cause the portion of said surface between the deflected portion and the grippers to be substantially lined up with an upper surface of a gripper anvil.

In some embodiments, the margin insert can be disposed around no more than 10% of the circumference of the pressure cylinder. In some embodiments, the margin insert can be disposed around no more than 5% of the circumference of the pressure cylinder.

In embodiments, a printing system comprises (a) an impression cylinder for use in transferring ink images to substrate from a rotating intermediate transfer member (ITM) comprising a flexible belt, the impression cylinder having an impression cylinder gap housing a plurality of grippers substantially recessed therein, such that during the transferring, a leading edge of the ink image is aligned with a first transfer point displaced circumferentially from the grippers on the surface of the impression cylinder, the location of the first transfer point corresponding to a dimension of an imprinted margin at the leading edge of the substrate; and (b) a pressure cylinder assembly comprising a pressure cylinder and a plurality of pressure cylinder coverings, the plurality of pressure cylinder coverings having in combination a differential thickness with respect to location on the circumference of the pressure cylinder, the differential thickness being effective to cause a change in the location of the first transfer point and thereby reduce the dimension of the unprinted margin.

In some embodiments, the plurality of pressure cylinder coverings can include a first pressure cylinder covering disposed around at least a majority of the circumference of the pressure cylinder and a second pressure cylinder covering disposed around no more than 10% of the circumference of the pressure cylinder. In some embodiments, the second pressure cylinder covering can be disposed around no more than 5% of the circumference of the pressure cylinder.

In some embodiments, the distance between the grippers and the first transfer point is determined at least in part by the thickness and location of the second pressure cylinder covering.

In some embodiments, the recessing of the grippers impression cylinder gap is effective to reduce a force on the ITM caused by the ITM's traversal of the grippers.

In some embodiments, it can be that (i) a surface of the impression cylinder comprises a deflected portion displaced circumferentially from the grippers, and (ii) the deflected portion includes a deflection in the surface of the impression cylinder, the deflection having an angle selected so as to cause the portion of said surface between the deflected portion and the grippers to be substantially lined up with an upper surface of a gripper anvil.

In some embodiments, the plurality of pressure cylinder coverings can additionally comprise a third cylinder covering, disposed around at least a majority of the circumference of the pressure cylinder and interposed between the pressure cylinder and the second cylinder covering.

In some embodiments, the plurality of pressure cylinder coverings can additionally comprise a third cylinder covering, disposed around at least a majority of the circumference of the pressure cylinder and interposed between the second cylinder covering and the first pressure cylinder covering.

In embodiments, a pressure cylinder assembly for use in a printing system for in transferring ink images to substrate from a rotating intermediate transfer member (ITM) comprising a flexible belt, the pressure cylinder assembly comprising: (a) a pressure cylinder; (h) first cylinder covering, disposed around at least a majority of the circumference of the pressure cylinder; and (c) a second cylinder covering, interposed between the pressure cylinder and first cylinder covering, and disposed around less than 5% of the circumference of the pressure cylinder, wherein a change in the local external geometry of the pressure cylinder assembly due to the presence of the second cylinder covering is effective to reduce a dimension of an unprinted margin on a leading edge of the substrate.

In some embodiments, the printing system can additionally comprise an impression cylinder having an impression cylinder gap housing a plurality of grippers substantially recessed therein.

In some embodiments, the pressure cylinder can have a pressure cylinder gap, the pressure cylinder can comprise an angle portion joining a trailing edge of the pressure cylinder gap and an outer circumferential surface of the pressure cylinder, and the second cylinder covering can overlay the angle portion.

In some embodiments, the second cylinder covering can overlay a portion of the circumference of the pressure cylinder that is operative to benefit the transfer to substrate of the leading edge of each ink image.

In some embodiments, the pressure cylinder assembly can additionally comprise a third cylinder covering, disposed around at least a majority of the circumference of the pressure cylinder and interposed between the pressure cylinder and the second cylinder covering.

In some embodiments, the pressure cylinder assembly can additionally comprise a third cylinder covering, disposed around at least a majority of the circumference of the pressure cylinder and interposed between the second cylinder covering and the first pressure cylinder covering.

In some embodiments, a printing system can comprise the pressure cylinder assembly.

A method is disclosed according to embodiments, of operating a printing system wherein ink images are formed by droplet deposition upon a rotating intermediate transfer member (ITM) and are subsequently transported by the ITM to an impression station where they are transferred to substrate, the impression station comprising (a) a rotatable impression cylinder having an impression cylinder gap housing a plurality of grippers substantially recessed therein, and (b) a pressure cylinder operative to rotate in the direction opposite that of the impression cylinder. The method comprises: at the impression station, applying a pressuring force between the pressure cylinder and the impression cylinder so as to transfer an ink image from the ITM to the substrate, such that during the transferring, a leading edge of the ink image is aligned with a first transfer point on a surface of the impression cylinder, wherein the portion of the circumference of the pressure cylinder opposing the first transfer point during each rotation of the impression cylinder is characterized by the presence of a margin insert interposed between the pressure cylinder and a compressible blanket disposed therearound, such that the presence of the margin insert is effective to reduce a dimension of an unprinted margin on a leading edge of the substrate.

In some embodiments, it can be that (i) the size and location of the margin insert at least partially determines a local external geometry of the pressure cylinder assembly, and (ii) the local external geometry of the pressure cylinder assembly at least partially determines the location of the first transfer point.

In some embodiments, it can be that (i) the pressure cylinder has a pressure cylinder gap, and (ii) the portion of the circumference of the pressure cylinder assembly opposing the first transfer point during each rotation of the impression cylinder is additionally characterized by an angle portion joining a trailing edge of the pressure cylinder gap and an outer circumferential surface of the pressure cylinder.

In some embodiments, the first transfer point can be located between the grippers and a deflected portion circumferentially displaced therefrom.

In some embodiments, the deflected portion can include a deflection in the surface of the impression cylinder, the deflection having an angle selected so as to cause the portion of said surface between the deflected portion and the grippers to be substantially lined up with an upper surface of a gripper anvil.

In some embodiments, a margin insert as disclosed herein can include a material with high frictional properties such that a frictional force between the underside of the margin insert and either a packing sheet or an outer circumferential surface of the pressure cylinder is effective to substantially prevent the margin insert from slipping circumferentially.

In some embodiments, a margin insert as disclosed herein can have a thickness between 50 microns and 1,000 microns.

In some embodiments, a margin insert as disclosed herein can have a thickness between 300 and 650 microns.

In some embodiments, a margin insert as disclosed herein can be at least 10% compressible.

In some embodiments, a margin insert as disclosed herein can be at least 20% compressible.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. Also, in some drawings the relative sizes of objects, and the relative distances between objects, may be exaggeratedly large or small for the sake of convenience and clarity of presentation. In the drawings.

DETAILED DESCRIPTION OF THE ILLUSTRATED EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary fix a fundamental understanding of the invention, the description taken with the drawings making apparent to those skilled in the art how the several forms of the invention may be embodied in practice. Throughout the drawings, like-referenced characters are generally used to designate like elements.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

In various embodiments, an ink image is first deposited on a surface of an intermediate transfer member (ITM), and transferred from the surface of the intermediate transfer member to a substrate (i.e. sheet substrate or web substrate). The location in the printing system at which the ink is deposited on the ITM is referred to as the "image forming station". In many embodiments, the ITM comprises a flexible or endless "belt" and the terms "belt" and "ITM" are used interchangeably.

The area or region of the printing press at which the ink image is transferred to substrate is an "impression station". It is appreciated that for some printing systems, there may be a plurality of impression stations. In some embodiments of the invention, the intermediate transfer member is formed as a belt comprising a reinforcement or support layer coated with a release layer.

Figure 1:
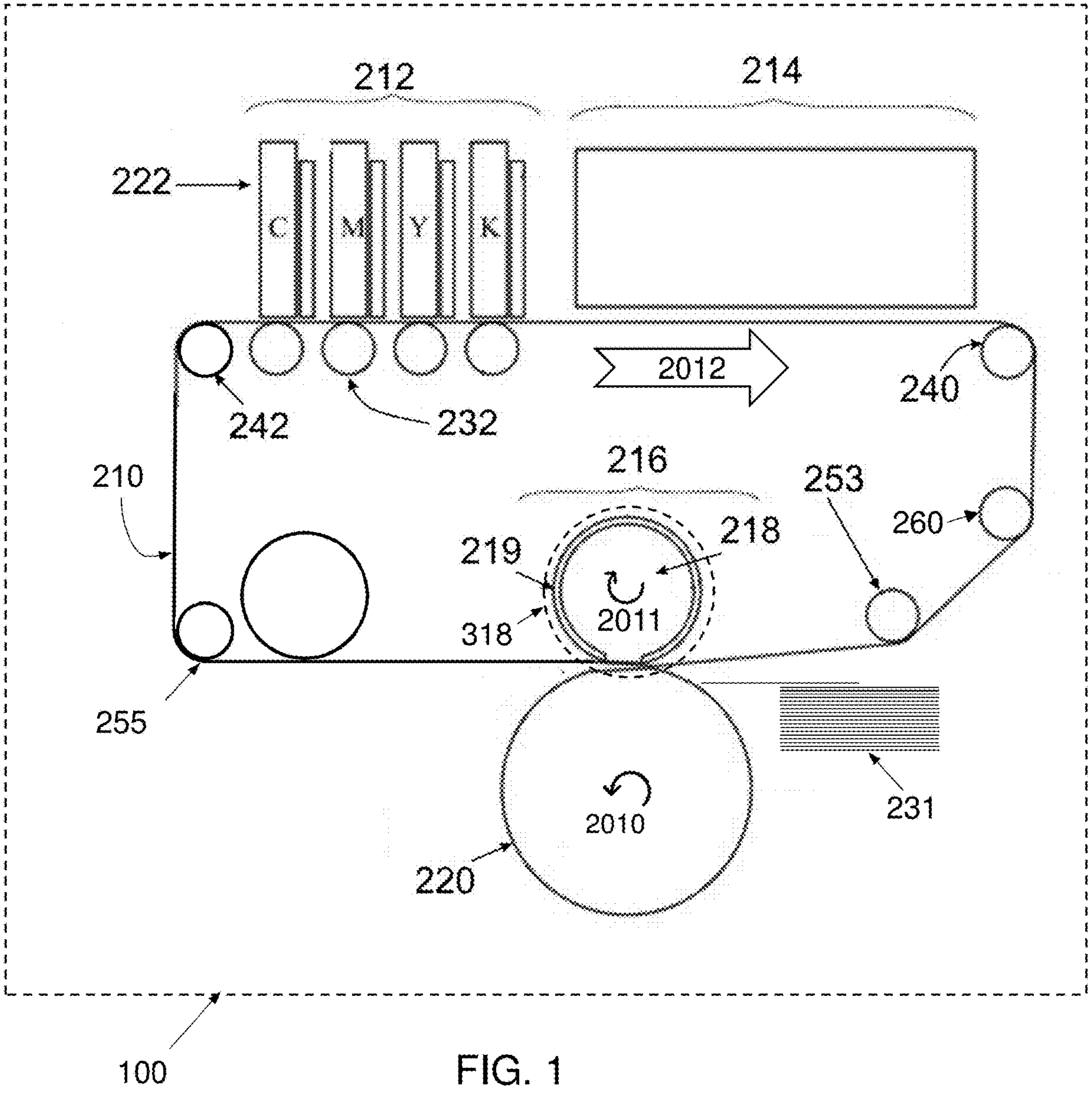
FIG. 1 is an elevation-view illustration of a printing system according to embodiments.

Referring now to the figures, FIG. 1 is a schematic diagram of a printing system 100 for indirect printing according to some embodiments of the present invention. The system 100 of FIG. 1 comprises an intermediate transfer member (ITM) 210 comprising a flexible endless belt mounted over a plurality of guide rollers 232, 240, 260, 253, 255, 242. This figure shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner. In the example of FIG. 1, the ITM 210 rotates in the clockwise direction relative to the drawing.

The printing system 100 can further comprise:

(a) an image forming station 212 comprising print bars 222A-222D (each designated one of C, M Y and K). The image forming station 212 is configured to form ink images 50 (shown in FIG. 2A) upon a surface of the ITM 210 (e.g., by droplet deposition thereon);

(b) a drying station 214 for drying the ink images;

(c) an impression station 216 where the ink images are transferred from the surface of the 210 to substrate 231. The substrate 231 is shown as sheet-fed substrate, such as paper or carton product, but it can alternatively be a continuous-feed (web) substrate. In the particular non-limiting example of FIG. 1; the impression station 216 comprises an impression cylinder 220 and a pressure cylinder assembly 318 which includes a pressure cylinder 218 and a compressible blanket 219 disposed around a large portion of the circumference of the pressure cylinder. The impression cylinder 220 is rotatable in the direction indicated by arrow 2010, so as to transport sheets of substrate 231. The pressure cylinder 218 can rotate synchronously with the with the impression cylinder 220 but in the opposite direction, as shown by arrow 2011. As is known in the art, the rotation of respective the cylinders can be synchronized through the use of gears and/or bearers on the corresponding cylinders.

The skilled artisan will appreciate that not every component illustrated in FIG. 1 is required. Also, it can be appreciated that such a printing system can include additional features and components such as, for example, a cooling station or a cleaning stations, and in some embodiments can include arrangements for performing duplex printing.

Figure 2A:
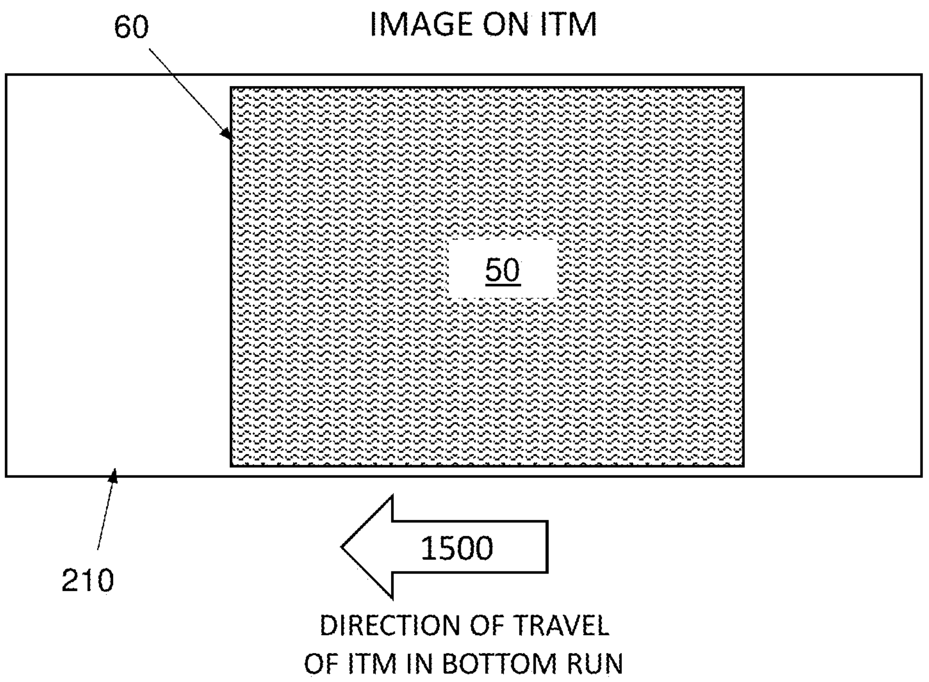
FIG. 2A is a schematic plan-view illustration of an ink image on the surface of an intermediate transfer member (UM), according to embodiments.
Figure 2B:
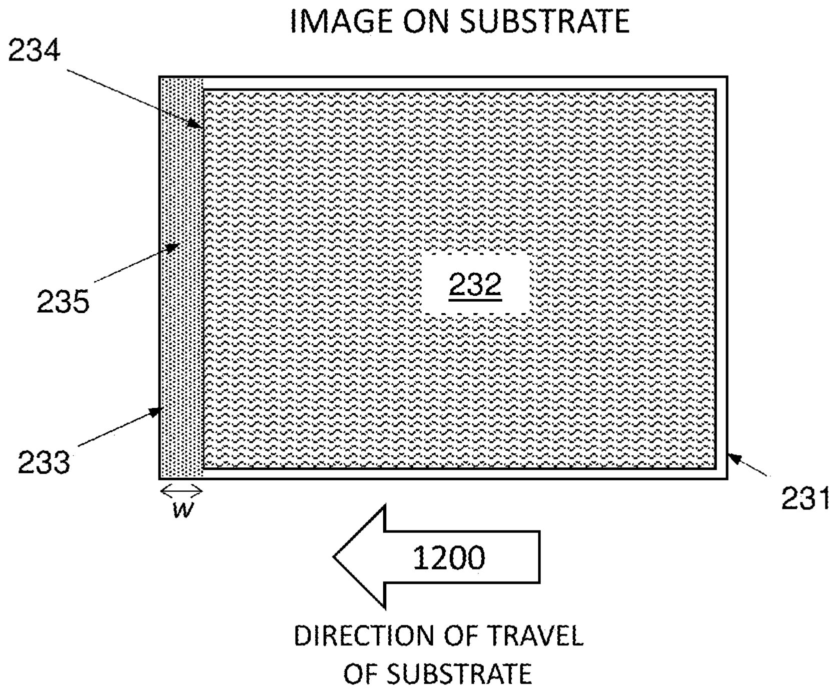
FIG. 2B is a schematic plan-view illustration of a printed image on substrate, according to embodiments.

Referring now to FIGS. 2A and 2B, an ink image 50 is shown on a section of the ITM 210 in the bottom run of a printing system, e.g., printing system 100 of FIG. 1. That the portion is noted as being in the bottom run is relevant for understanding the direction of travel of the ITM 210 and the ink image 50; the direction 1500 being shown by the numbered arrow; the direction 1500 follows the same convention as established in the discussion of FIG. 1. Thus, the left side of the ink image 50 is the leading edge 60 in the direction of travel. That the portion is noted as being in the bottom run is also relevant to the status of the ink image 50. The ink image 50 is formed at the image-forming station 212 by deposition of ink droplets on the surface of the ITM 210; during transport to the impression station by the ITM 210, the ink image 50 subsequently undergoes a drying process at drying station 214. When the ink image 50 arrives in the bottom run of the printing system 100 and approaches the impression station 216, it can comprise a mostly dried film of ink components such as colorants. This residual film on the surface of the ITM 210, referred to as ink image 50, is substantially transferred to substrate 231 from the surface of the 210 when the ITM 210 passes between the pressure cylinder 218 and the impression cylinder 220. A pressure is applied between the two cylinders 218, 220, either by urging the pressure cylinder towards the impression cylinder 220, or by urging the impression cylinder 220 towards the pressure cylinder 218. FIG. 2B shows the resulting transferred ink image or 'printed image' 232 on substrate 231, i.e., the result of transferring the ink image 50 from the ITM 210 to substrate 231. The leading edge 234 of the printed image 232 corresponds to the leading edge 60 of the ink image 50 transferred from the ITM 210. The image transfer typically leaves a gap, or 'unprinted margin' 235, between the leading edge 234 of the printed image 232 and the leading edge 233 of the sheet of substrate 231. The width w of the unprinted margin 235 (i.e., the dimension of the margin in the direction of travel 1200) can include a gripper margin, i.e., a leading-edge margin that is caused by the size of the gripper bite, and additional margin space related to the design of the impression station 216 or one or more of its components.

Figure 3A:
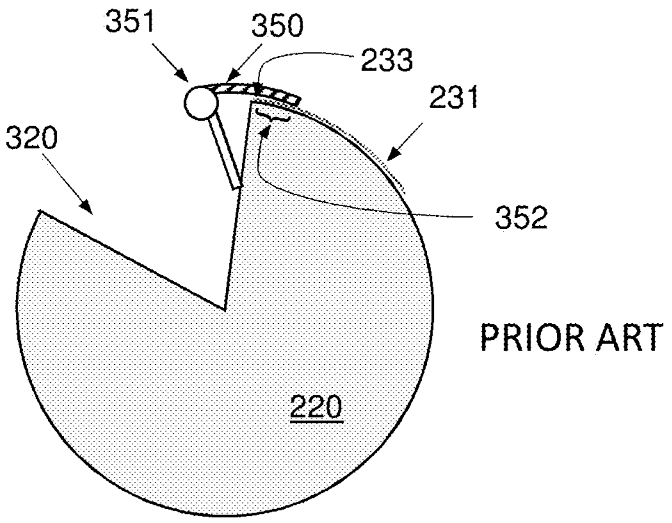
FIG. 3A is a schematic cross-section view of a prior-art impression cylinder.

FIG. 3A is a schematic cross-section illustration of a prior-art impression cylinder 220 with an impression cylinder gap 320 and a gripper bar 351 to which are attached a plurality of grippers 350 configured to 'grip' substrate 231, e.g. sheet-fed substrate such as paper or carton. As shown in FIG. 3A, a prior art gripper arrangement can be such that grippers 350 hold the leading edge 233 of substrate 231 on the outside of the cylinder 220 and thus the gripper 350 can sit largely or almost completely—or even completely—outside the circumference of the cylinder 220. A 'gripper' bite 352 corresponds to the overlap of the gripper 350 with the substrate 231. In such a case the unprinted margin 235 on the substrate 231 can be expected to have a width (w in FIG. 2B) that is slightly larger than the gripper bite 352.

Figure 3B:
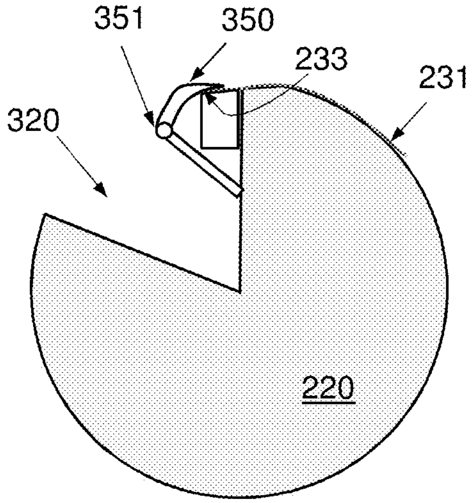
FIG. 3B is a schematic cross-section view of an impression cylinder according to embodiments.

FIG. 3B illustrates an impression cylinder 220 according to embodiments, wherein the grippers 350 are substantially recessed (meaning, in this disclosure: either completely recessed, or at least 90% recessed, or at least 80% recessed) inside the impression cylinder gap 320 so as to substantially not extend (meaning: either the grippers 350 don't extend at all, or at most of the grippers 350 extend by 10% or 20%) beyond the circumference of the impression cylinder, i.e., the virtual cylinder where the cylindrical circumference would be without the discontinuity of the impression cylinder gap 320. One of the reasons for selecting a design with recessed grippers can be so as to avoid damage or excessive wear of the ITM 210 as it traverses the impression station. Another reason can be to avoid damage or misalignment of the grippers from the same encounter (during every rotation) with the ITM 210.

Figure 4A:
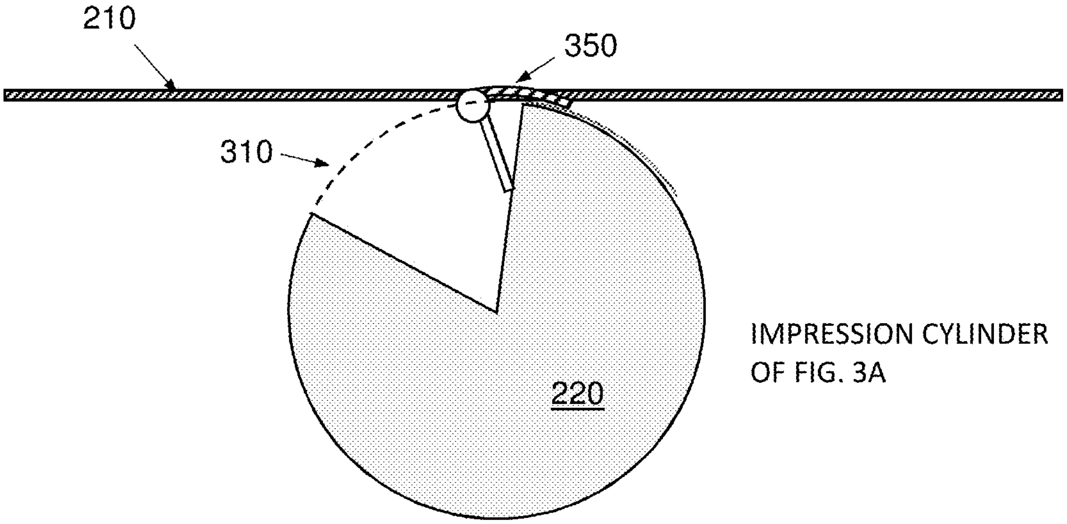
FIGS. 4A and 4B show the impression cylinders of FIGS. 3A and 3B, respectively, in proximity to a portion of an ITM according to embodiments.
Figure 4B:
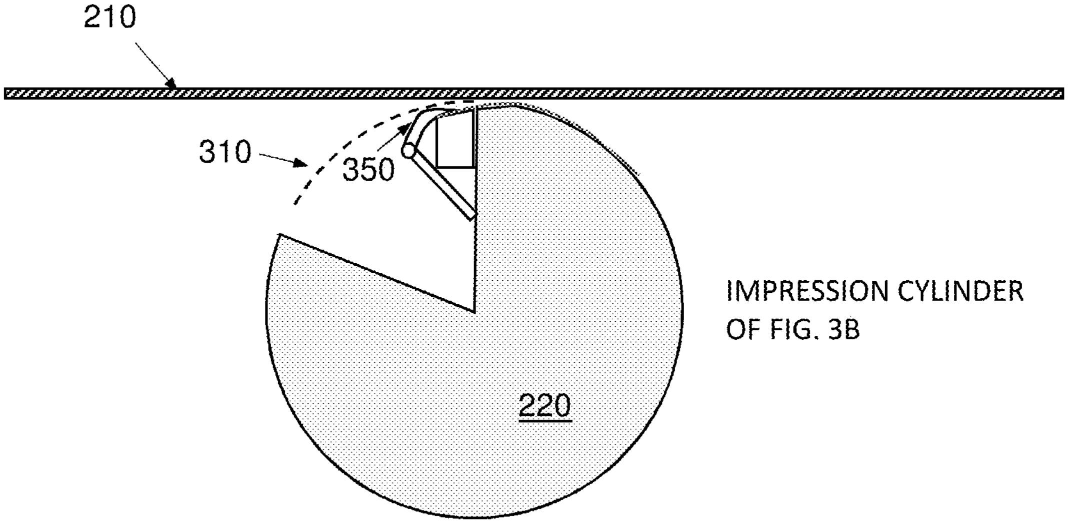

We refer now to FIGS. 4A and 4B, which illustrate how mechanical contact between the grippers 350 and the ITM 210—which cause friction force, shear force, and other possible forces—can be reduced when the grippers 350 are recessed. In FIG. 4A, the prior-art impression cylinder 220 of FIG. 3A is shown in proximity to the ITM 210. The grippers 350 extend well outside what would be the cylindrical circumference of the impression cylinder 220 (if the cylinder were whole and did not have an impression cylinder gap 320), the cylindrical circumference being represented by dashed-line arc 310. The grippers 350 are clearly in the path of the rotating ITM 210 on each rotation of the impression cylinder 220 and can be expected to come in regular contact with the ITM 210 and possibly shorten the life of the ITM 210. In FIG. 4B, the impression cylinder 220 of FIG. 3B is shown similarly in proximity to the ITM 210. The grippers 350 are recessed and are entirely within what would be the cylindrical circumference of the impression cylinder 220 again represented by dashed-line arc 310. The mechanical contact between the grippers 350 and ITM 210 is greatly reduced in comparison to the prior art impression cylinder 220 of FIGS. 3A and 4A. In other examples, the grippers can extend slightly out of the impression cylinder gap 320, while being 'substantially recessed' in the cylinder gap 320 for the purposes of this disclosure.

Figure 5:
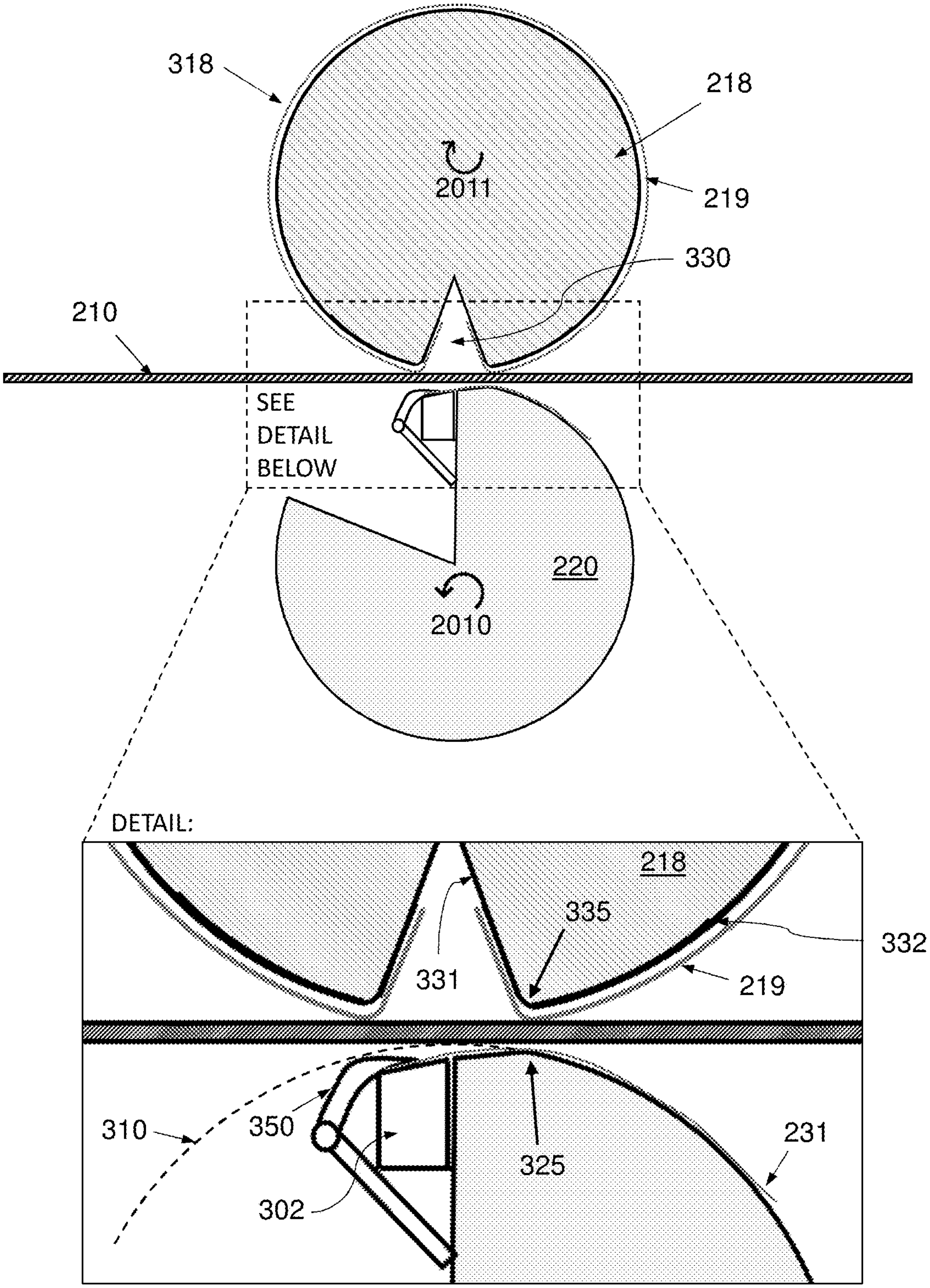
FIG. 5 is a schematic cross-section view of a pressure cylinder assembly according to embodiments, in proximity to the impression cylinder and ITM of FIG. 4B.

Referring now to FIG. 5, the impression cylinder of FIGS. 3B and 413 is shown in proximity to a pressure cylinder assembly 318, as would be the case in an impression station 216. The pressure cylinder assembly 318 includes a pressure cylinder 218 which has a pressure cylinder gap 330. The trailing edge 331 is the edge of the gap 330 'trailing' the gap 330 relative to the direction of rotation of the pressure cylinder 218, which as shown by arrow 2011 is 'clockwise' from the perspective of the drawings. The pressure cylinder 218 includes an 'angle portion' 335 where the trailing edge 331 of the pressure cylinder gap 330 meets the outer circumferential surface 332 of the pressure cylinder 218. In embodiments, the impression cylinder 220 and the pressure cylinder assembly 318 are made to rotate simultaneously with each other and in opposite rotation directions (as shown by arrows 2011 and 2010). By 'simultaneously,' it meant that the two cylinders rotate not only at the same time but also 'in phase' with each other, i.e., so that any given portion of the impression cylinder 220 faces (is opposite) the same portion of the pressure cylinder 218 on every rotation. In some embodiments (not shown), the circumference of the impression cylinder 220 can be an integer multiple greater than 1 of the circumference of the pressure cylinder. All of the illustrations accompanying this disclosure are drawn to the case where the two cylinders have substantially the same circumference, but this is merely for convenience. In some embodiments, the rotation of the pressure cylinder 218 is arranged so that the angle portion 335 is opposite, or ahead of (in the direction of pressure cylinder rotation 2011, the leading edge 60 of the ink image 50 on the ITM 210 during transfer.

In the prior art design of FIG. 3A, the grippers 350 hold substrate 231. e.g., sheet-fed substrate, on the smooth, cylindrical external surface of the impression cylinder 220. The presence of the grippers 350 does not affect the shape or quality of the substrate 231 by creasing or wrinkling it. A design goal of the gripper-cylinder interface when recessing the grippers 350 within the impression cylinder gap 220, therefore, can be to ensure that any substrate held by the grippers 350 is not wrinkled, bent, creased or similar, despite the fact that recessed grippers obviously will not be gripping the substrate atop the smooth, cylindrical external circumferential surface of the impression cylinder 220; instead the grippers 350 grip the substrate 'below' the surface of the cylinder, and the substrate extends from there to the outer surface of the cylinder.

In the non-limiting example of FIG. 5, the impression cylinder 220 has a 'deflected portion' 325 that includes a deflection in the surface of the impression cylinder 220. An effect of this deflection is to cause a section of the surface to be deflected inside, and not touching, the cylindrical circumference 310. The section of the surface that is 'inside and not touching' includes the section between the deflected portion 325 and the grippers 350. The term 'deflected portion' is used herein to include embodiments in which the 'deflected portion' is a single point at which the slope of the surface changes, and also to include embodiments in which the 'deflected portion' comprises more than just a single point. For example, the deflected portion 325 can include a section of the cylinder 220 that is machined with a relatively large radius so as to produce a more gradual change in slope or direction along the deflected portion 325. A larger radius may be useful in reducing a possible tendency of the substrate to receive a wrinkle or a crease when transported by an impression cylinder 220 with recessed grippers 350. In order to achieve the design goal of not wrinkling or creasing the substrate when gripping it, the cylinder surface in the example of FIG. 5 is deflected, from the deflected portion 325 in the direction of the grippers 350, at a slope matching, or similar to, the slope of an upper surface of a gripper anvil 302, Moreover, the surface of the cylinder between the deflected portion 325 and the grippers 350 can be designed so as to 'meet' the upper surface of the gripper anvil 302 not only with the same slope but also without a step. In this manner, when recessed grippers 350 'grip' the substrate 231 to the top of the gripper anvil 302, there is no wrinkling or creasing of the substrate 231. Obviously, the gripper anvil 302 need not be a separate element as shown, and can alternatively (in examples that are not illustrated) include an integral extension of the cylinder surface from the deflected portion 325 in the direction of the grippers 350 such that the grippers 350 grip the substrate 231 to the integral extension. The integral extension would thus perform the same function of the gripper anvil 302, i.e., provide a surface beneath the substrate 231 at the point where the gripper 350 grip. In other examples (not shown), the surface of the cylinder between the deflection portion 325 and the grippers 350, as well as the upper surface of the gripper anvil 302 (if present) can have a curved shape instead of a straight linear shape.

It will be obvious to the skilled artisan that, as the angle of the deflected portion 325 causes the surface of the impression cylinder between the grippers and the deflected portion 325 to be further displaced inwards and away from the external cylindrical circumference (dashed-line 310), it becomes more difficult for the leading edge 60 of the ink image 50 to be transferred to substrate at a point that is as close to the grippers as may be desired.

Figure 6A:
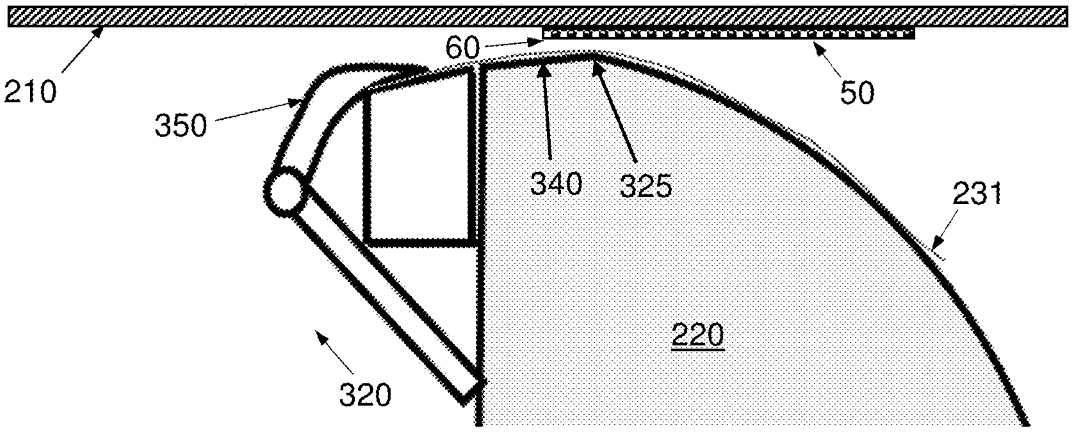
FIG. 6A is a schematic cross-section view of the impression cylinder and ITM of FIG. 4B showing the ink image of FIG. 2A and its position relative to components of the impression cylinder, according to embodiments.
Figure 6B:
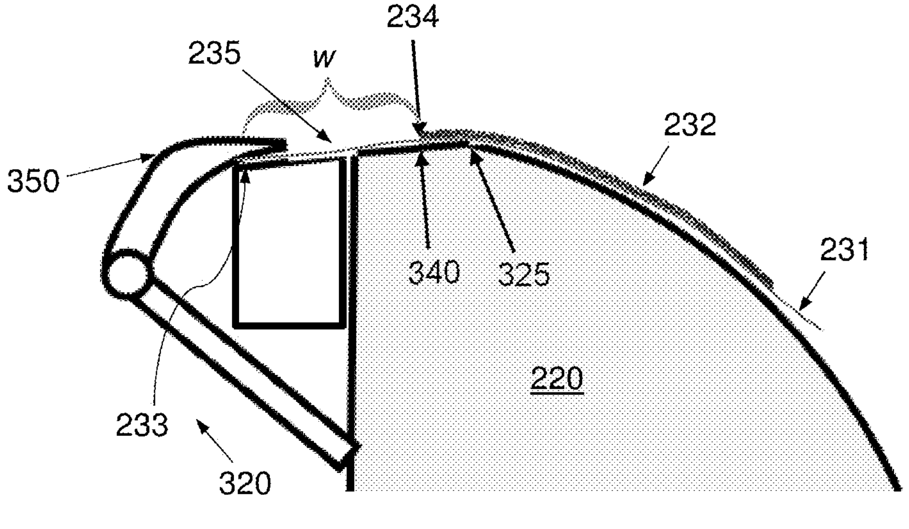
FIG. 6B is a schematic cross-section view of the impression cylinder and ITM of FIG. 4B showing the printed image of FIG. 2B and its position relative to components of the impression cylinder, according to embodiments.

Referring now to FIG. 6A, part of an impression cylinder 220 having grippers 350 recessed within an impression cylinder gap 320 is shown, together with an ink image 50 transported by an ITM 210. A sheet of substrate 231 is held onto the cylinder 220 by grippers 350. The leading edge 60 of the ink image 50 is lined up opposite (or above, in the illustrated configuration) a first transfer point 340 on the impression cylinder 220. Conceptually, FIG. 6A schematically represents the moment before transfer of the ink image from the ITM to the substrate actually begins. The first transfer point 340 is the point on the impression cylinder 220 corresponding to (e.g., underneath) the point at Which the leading edge 60 of the ink image 50 will be transferred to substrate. In some embodiments, the first transfer point 340 also corresponds to the chronologically-first point of transfer of the ink image 50. FIG. 6B schematically represents the results of said transfer. The impression cylinder 220 is illustrated in FIG. 6B in the same position as if it hasn't rotated during and after the transfer, but this is only for convenience in order to show the aspects of the transfer that are relevant to this discussion. In actuality, the cylinder 220 will have been rotated counterclockwise relative to the drawing, and it is likely that the substrate 231 will have already been 'handed off' to another component of the printing system 100, e.g., for stacking, immediately after the transfer. The methods and systems disclosed herein are suitable for implementation in a printing system capable of printing thousands of pages or images per hour, so the cycle of transferring an ink image and making the handoff from the impression cylinder to another component can be very quick, e.g., taking as little as less than one second per cycle, or less than half a second, or less than 100 milliseconds. It can be seen in FIG. 6B that the leading edge 234 of the printed image 232 on the substrate 231 corresponds to first transfer point 340, which is between the deflected portion 325 and the grippers 350, leaving an unprinted margin 235 between the leading edge 233 of the substrate and the leading edge 234 of the printed image.

In order to increase utilization of substrate or to allow a larger image, it can be desirable to reduce width w of the unprinted margin 235 by causing the first transfer point 340 to be closer to the grippers 350. This can be accomplished, for example, by modifying the external geometry of the pressure cylinder assembly 318 in the area of the cylinder surface that is opposite the first transfer point 340 during each rotation—i.e., the angle portion 335.

Figure 7:
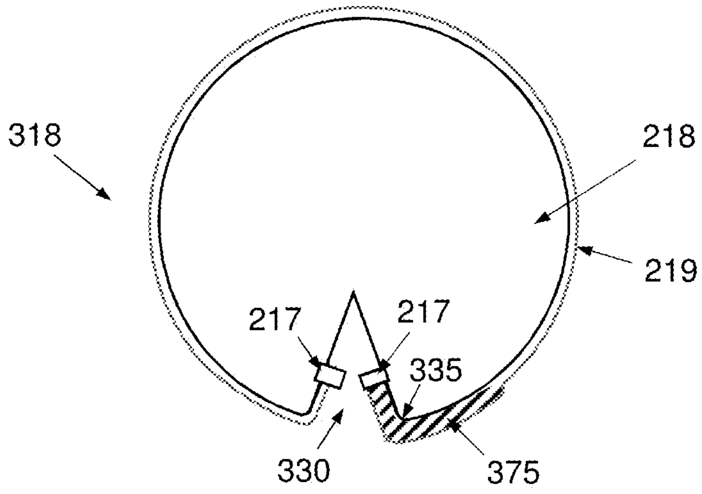
FIG. 7 is a schematic cross-section of the pressure cylinder assembly of FIG. 5, additionally comprising a margin insert according to embodiments.

We refer now to FIG. 7. In embodiments, a margin insert 375 is provided in a pressure cylinder assembly 318. The margin insert is interposed between the pressure cylinder 218 and compressible blanket 219 at the angle portion 335 so as to change the external geometry of the pressure cylinder assembly 318 by dint of its location and thickness. The thickness of the margin insert 375 is shown in the various figures as greater than that of other components of the pressure cylinder assembly 318 but this is merely to show the feature clearly and no conclusions should be drawn as to relative thicknesses. In combination, the compressible blanket 219 and margin insert 375 together have a differential thickness with respect to position on the circumference of the pressure cylinder 218, Specifically, the combination of blanket 219 and margin insert 375 is thicker in the area of the angle portion 335 of the pressure cylinder 218 than at points on the circumference of the pressure cylinder 218 where there is no margin insert. As visualized in FIG. 8, the pressure cylinder 218 can be arranged so that in each rotation the angle portion 335—'thickened' by the presence of the margin insert 375—is opposite the first transfer point 340. The effect of the thickening of the combined cylinder coverings by employing the margin insert 375 is to allow the pressure cylinder assembly to apply pressure when the thickened angle portion 335 opposes the section of the impression cylinder surface between the deflected portion 325 and the grippers 350 during the transfer of the ink image. The extra thickness at the angle portion 335 extends beyond the regular cylindrical circumference of the pressure cylinder assembly 318 and can thus impinge on this section of the impression cylinder surface that is 'inside' the virtual volume of the cylindrical circumference. Applying this pressure against the portion of the impression cylinder surface that is between the deflected portion 325 and the grippers 350 has the effect of 'moving' the first transfer point 340 further away from the deflected portion 325 and closer to the grippers 350. In other words, the presence of the margin insert 375, including its location and size or thickness, causes the leading edge 234 of the printed image 232 to be printed closer to the leading edge 233 of the substrate 231, thereby reducing the width w of the unprinted margin 235.

The length of the margin insert 375, or, alternatively, the proportion of the circumference of the pressure cylinder 218 around which the margin insert 375 is disposed, can be selected so as to maximize the reduction of the width w (shown in FIG. 6B) of the unprinted margin 235. While shown in the accompanying drawings as extending around a substantial, albeit minority, proportion of the circumference, the margin insert 375 in some implementations is smaller and extends around from an attachment point on the trailing edge 331 (e.g., of FIG. 5) of the pressure cylinder gap 330 only enough to cover the angle portion 335 and very little of the outer circumferential surface 332 (of the pressure cylinder 218) on the 'far side' of the angle portion 335 from the pressure cylinder gap 330. The proportion of the cylinder's circumference covered by the margin insert 375 can be less than 10%, or less than 5%. It is primarily, and in some embodiments exclusively, the coverage of the angle portion 335 by the insert margin 375 that affects the position of the first transfer point 340 and of the leading edge 234 of the printed image 232. In some embodiments, it is preferable that the margin insert 375 not extend beyond the point on the pressure cylinder 218 that is opposite, in each rotation, the deflected portion 325 of the impression cylinder 220.

Figure 8:
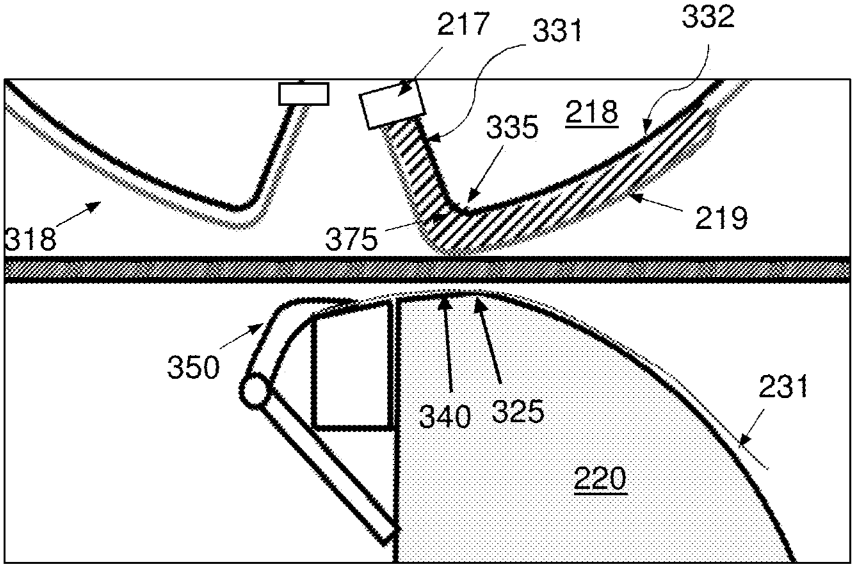
FIG. 8 shows a detail of the pressure cylinder assembly of FIG. 7 in proximity to the impression cylinder and the ITM of FIG. 4B.

As shown in FIG. 8, the compressible blanket 219 and the margin insert 375 can share an attachment arrangement 217 that attaches the respective ends of the two coverings to the trailing edge 331 of the pressure cylinder gap 330.

Figure 9:
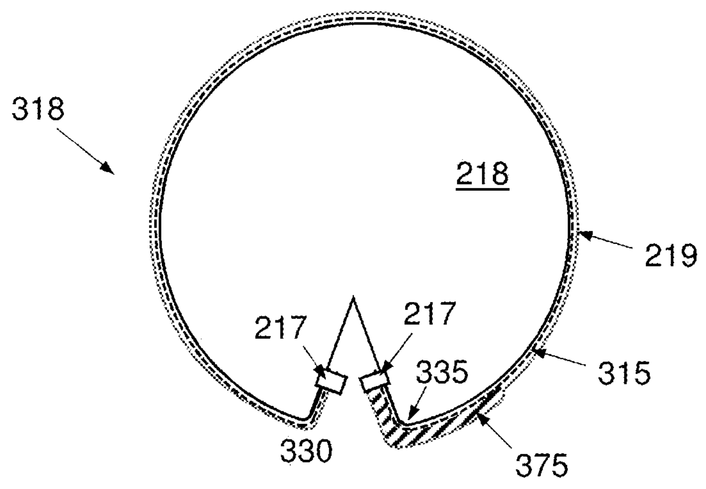
FIG. 9 is a schematic cross-section of the pressure cylinder assembly of FIG. 7, additionally comprising a packing sheet according to a first embodiment.
Figure 10:
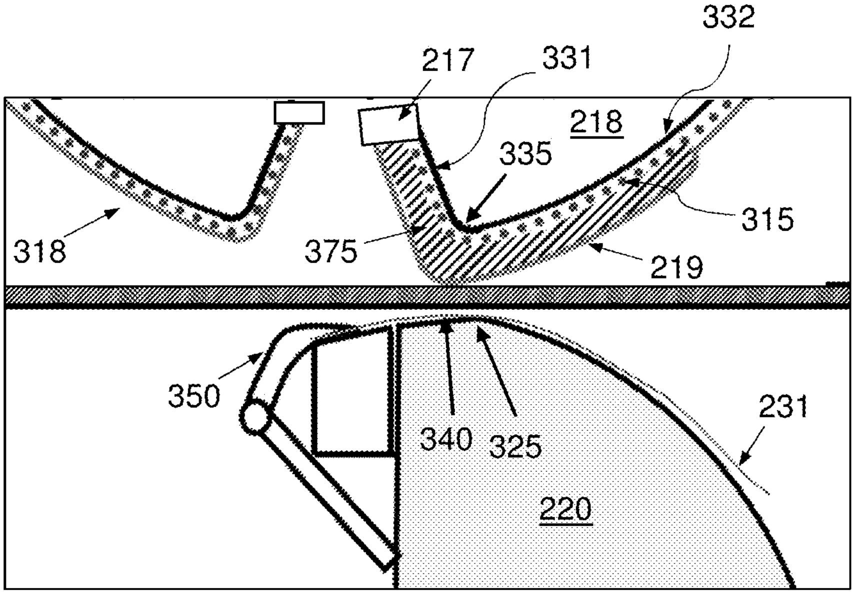
FIG. 10 shows a detail of the pressure cylinder assembly of FIG. 9 in proximity to the impression cylinder and ITM of FIG. 4B.

We now refer to FIGS. 9 and 10. It is known in the art to provide a packing or under-packing sheet 315 in a pressure cylinder assembly 318, generally interposed between the compressible blanket 219 and the pressure cylinder 218. A packing sheet 315, most often used to adjust the circumference of the pressure cylinder 218 in order to adjust transfer pressure for various substrate materials. According to a first embodiment, when a margin insert 375 is provided, it is preferably interposed between the packing sheet 315 and the compressible blanket 219, as illustrated in FIG. 9. FIG. 10 is similar to FIG. 8 except with a packing sheet 315 disposed around the circumference of the pressure cylinder 218, with the margin insert 375 interposed between the packing sheet 315 and the compressible blanket 218. Additionally or alternatively, packing can be provided between the margin insert 375 and the compressible blanket 219.

Figure 11:
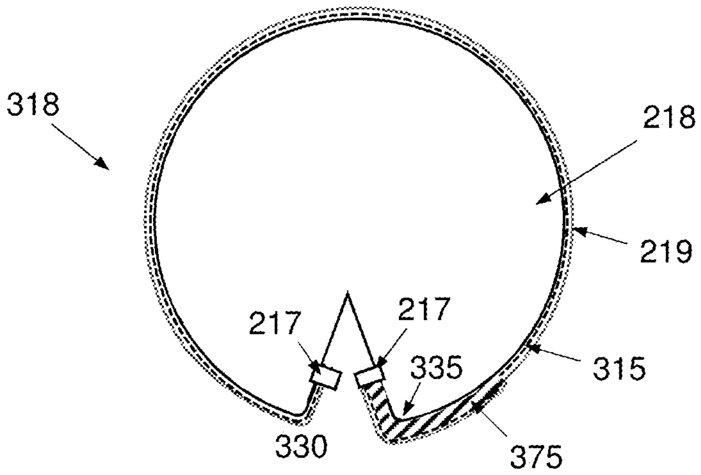
FIG. 11 is a schematic cross-section of the pressure cylinder assembly of FIG. 7, additionally comprising a packing sheet according to a second embodiment.
Figure 12:
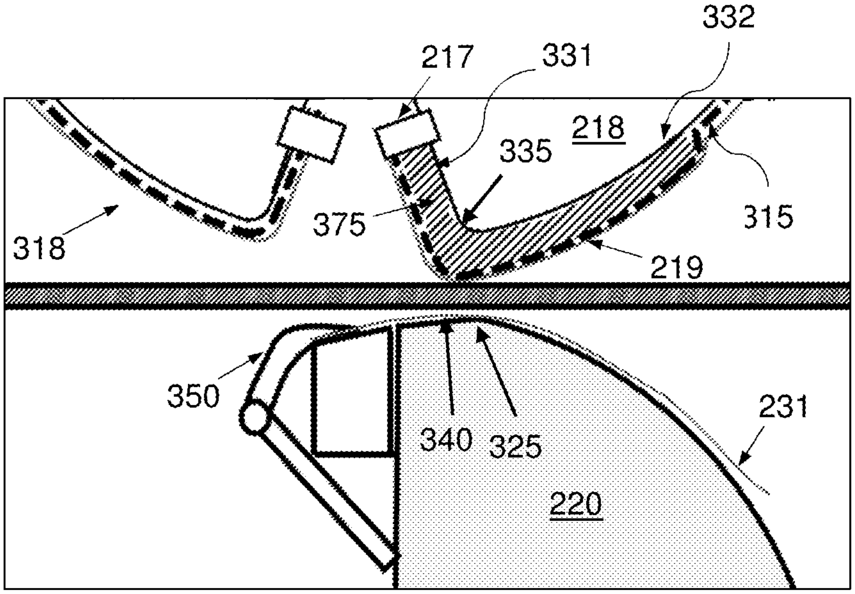
FIG. 12 shows a detail of the pressure cylinder assembly of FIG. 11 in proximity to the impression cylinder and ITM of FIG. 4B.

We now refer to FIGS. 11 and 12. According to a second embodiment, when a margin insert 375 is provided, it is preferably interposed between the pressure cylinder 218 and the packing sheet 315, as illustrated in FIG. 11. FIG. 12 is similar to FIGS. 8 and 10 except with a packing sheet 315 disposed around the circumference of the pressure cylinder 218, with the margin insert 375 interposed between pressure cylinder 218 and the packing sheet 315 and the compressible blanket 218.

According to an alternative embodiment (not shown), a packing sheet can integrally include a margin insert, e.g., together forming a single unit of cylinder covering, such that the resulting packing sheet is thicker around the angle portion 335 than around the remainder of the pressure cylinder 218. Such a packing sheet could be produced, for example, by using 3-D printing methods or any other suitable method. According to this embodiment, the combined pressure cylinder coverings, i.e., the differentially thicker packing sheet and the compressible blanket 219 would have, in combination, a differential thickness with respect to location on the circumference of the pressure cylinder 218, similar to the compressible blanket 219 in combination with the margin insert 375, with or without a 'regular' packing sheet 315.

"Differential thickness" as used throughout this disclosure refers to deliberately differential thickness, i.e., that is not slight or accidental or resulting, for example, from variations in manufacturing processes. For example, 'differential thickness' can mean at least a ratio of 1.5:1, or at least a ratio of 3:1, or at least a ratio of 3:1, between thicker and less thick sections.

In some embodiments, it can be advantageous for a margin insert 375 to have specific physical characteristics. For example, it can be desirable for a margin insert 375 to include, on its underside (i.e., when installed in a pressure cylinder assembly 318, a material with high frictional properties such that a frictional force between the underside of the margin insert 375 and either a packing sheet 315 or an outer circumferential surface 332 of the pressure cylinder 218 is effective to substantially prevent the margin insert 375 from slipping circumferentially. As another example, it can be desirable for a margin insert 375 to have a thickness between 50 microns and 1,000 microns or between 300 and 650 microns. As yet another example, it can be desirable for a margin insert to be least 10% or at least 20% compressible in the vertical (i.e., radially inward when installed in a pressure cylinder assembly 318) direction.

Example

In an example, a printing system comprises a rotating ITM and an impression station as described herein. The impression station comprises a pressure cylinder assembly which includes a pressure cylinder having a pressure cylinder gap, a packing sheet and a compressible blanket. The impression station additionally comprises an impression cylinder comprising an impression cylinder gap that houses that are recessed so as to avoid damaging the ITM from frequent and intensive mechanical contact with the grippers on each rotation of the impression cylinder. The surface of the impression cylinder includes a deflection portion such that a section of the surface of the cylinder between the deflection portion and the grippers is 'inside' and displaced inwards from the cylindrical circumference of the impression cylinder. The angle portion is aligned so that during each rotation it is opposite the first transfer point of the impression cylinder, i.e., the point on the cylinder between the deflection portion and grippers that corresponds to (aligned with) the point on the substrate where the leading edge of the ink image is transferred. Following a representative sample of normal print runs, an average unprinted margin of about 20 mm is measured at the leading edges of sheets of printed substrate.

A first margin insert with dimensions of 30 mm length, 150 microns thickness, and a width of 1,000 mm, substantially equal to the width compressible blanket across the length of the cylinder) is attached to the trailing edge of the pressure cylinder gap (i.e., trailing in the direction of rotation) and wrapped around the angle portion of the cylinder, i.e., the angle portion that joins the trailing edge of the pressure cylinder gap and the outer circumferential surface of the pressure cylinder. The angle portion is aligned so that during each rotation it is opposite the first transfer point of the impression cylinder. Following a normal print run, an unprinted margin of 14 mm is measured at the leading edge of each sheet of printed substrate.

The first margin insert is replaced by a second margin insert with dimensions of 30 mm length, 550 microns thickness, and a width of 1000 mm, the same width that is substantially equal to the width compressible blanket across the length of the cylinder. Following a normal print run, an unprinted margin of 10 mm is measured at the leading edge of each sheet of printed substrate.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A method of operating components of a printing system 100, the method comprising:

I. transporting ink-images 50, which are disposed on an intermediate transfer member (ITM) 210, to an impression station 216, the impression station 216 comprising:
  - i. a rotatable impression cylinder 220 having an impression cylinder gap 320, and
  - ii. a pressure cylinder assembly 318 comprising:
    - (A) a pressure cylinder 218 having a pressure cylinder gap 330 and operative to rotate synchronously with the impression cylinder 220 and in an opposing direction thereto, the pressure cylinder 218 comprising an angle portion 335 joining a trailing edge 331 of the pressure cylinder gap 330 and an outer circumferential surface 332 of the pressure cylinder 218,
    - (B) a compressible blanket 219 disposed around at least a portion of the circumference of the pressure cylinder 218, and
    - (C) a margin insert 375 interposed between the pressure cylinder 218 and the compressible blanket 219 at least at the angle portion 335, such that a local external geometry of the pressure cylinder assembly 318 at the angle portion 335 is changed by the presence of the margin insert 375, II. at the impression station, applying pressuring force between the pressure cylinder 218 and the impression cylinder 220 so as to transfer ink image(s) 50 from the intermediate transfer member (ITM) 210 to substrate 231, wherein the change in the local external geometry of the pressure cylinder assembly 318 due to the presence of the margin insert 375 is effective to reduce a dimension of an unprinted margin 235 on a leading edge 233 of the substrate 231.

2. The method of claim 1, wherein the pressure cylinder assembly 318 additionally comprises:

(D) a packing sheet 315 disposed around at least a majority of the circumference of the pressure cylinder 218, interposed between the pressure cylinder 218 and the compressible blanket 219, such that the margin insert 375 is interposed between the packing sheet 315 and the compressible blanket 219.

3. The method of claim 1, wherein the pressure cylinder assembly 318 additionally comprises:

(D) a packing sheet 315 disposed around at least a majority of the circumference of the pressure cylinder 218, interposed between the pressure cylinder 218 and the compressible blanket 219, such that the margin insert 375 is interposed between the pressure cylinder 218 and the packing sheet 315.

4. The method of claim 1, wherein the local external geometry of the pressure cylinder assembly 318 at the angle portion 335 is determined at least in part by the thickness and location of the margin insert 375.

5. The method of claim 1 wherein the impression cylinder gap 320 of the rotatable impression cylinder 220 houses a plurality of grippers 350 which are substantial recessed within the impression cylinder gap 320.

6. The method of claim 5, wherein i. a surface of the impression cylinder 220 comprises a deflected portion 325 displaced circumferentially from the grippers 350, and ii. during each rotation of the impression cylinder 220, transfer of an ink image 50 from the ITM 210 to the substrate 231 starts at a first transfer point 340 on the surface of the impression cylinder 220 located between the grippers 350 and the deflected portion 325.

7. The method of claim 5, wherein the distance between the grippers 350 and the first transfer point 340 is determined at least in part by the thickness and location of the margin insert 375.

8. The method of claim 5, wherein the deflected portion 325 includes a deflection in the surface of the impression cylinder 220, the deflection having an angle selected so as to cause the portion of said surface between the deflected portion 325 and the grippers 350 to be substantially lined up with an upper surface of a gripper anvil 302.

9. A method of operating components of a printing system 100, the method comprising:

providing an impression cylinder 220 of the printing system the impression cylinder 220 having an impression cylinder gap 320 housing a plurality of grippers 350 substantially recessed therein;

providing a pressure cylinder assembly 318 comprising a pressure cylinder 218 and a plurality of pressure cylinder coverings, the plurality of pressure cylinder coverings having in combination a differential thickness with respect to location on the circumference of the pressure cylinder 218; and applying pressuring force between the pressure cylinder 218 and the impression cylinder 220 so as to transfer ink image(s) 50 from an intermediate transfer member (ITM) 210 of the printing system to substrate 231, wherein:

A. during the transferring, a leading edge 60 of the ink image 50 is aligned with a first transfer point 340 is displaced circumferentially from the grippers 350 on the surface of the impression cylinder 220, the location of the first transfer point 340 corresponding to a dimension of an unprinted margin 235 at the leading edge 233 of the substrate 231; and B. the differential thickness provided by the plurality of pressure cylinder coverings is effective to cause a change in the location of the first transfer point 340 and thereby reduce the dimension of the unprinted margin 235.

10. The method of claim 9, wherein the distance between the grippers 350 and the first transfer point 340 is determined at least in part by the thickness and location of the second pressure cylinder covering 375.

11. The method of claim 9, wherein the recessing of the grippers 350 impression cylinder gap 320 is effective to reduce a force on the ITM 210 caused by the ITM's traversal of the grippers 350.

12. The method of claim 9, wherein:

i. a surface of the impression cylinder 220 comprises a deflected portion 325 displaced circumferentially from the grippers 350, and ii. the deflected portion 325 includes a deflection in the surface of the impression cylinder 220, the deflection having an angle selected so as to cause the portion of said surface between the deflected portion 325 and the grippers 350 to be substantially lined up with an upper surface of a gripper anvil 302.

13. The method of claim 9, wherein the plurality of pressure cylinder coverings additionally comprises a third cylinder covering 315, disposed around at least a majority of the circumference of the pressure cylinder 218 and interposed between the pressure cylinder 218 and the second cylinder covering 375.

14. The method of claim 9, wherein the plurality of pressure cylinder coverings additionally comprises a third cylinder covering 315, disposed around at least a majority of the circumference of the pressure cylinder 218 and interposed between the second cylinder covering 375 and the first pressure cylinder covering 219.

15. A method of operating a pressure cylinder assembly 318 of printing system 100, the method comprising:

(A) providing the pressure cylinder assembly, the pressure cylinder assembly comprising:

a. a pressure cylinder 218;

b. first cylinder covering 219, disposed around at least a majority of the circumference of the pressure cylinder 218; and c. a second cylinder covering 375, interposed between the pressure cylinder 318 and first cylinder covering 219, and disposed around less than 5% of the circumference of the pressure cylinder 218, (B) operating the pressure cylinder assembly such that:

i. a pressuring force between the pressure cylinder 218 and an impression cylinder 220 of the printing system transfers ink images 50 from an intermediate transfer member (ITM) 210 of the printing system to substrate 231; and ii. a change in the local external geometry of the pressure cylinder assembly 318 due to the presence of the second cylinder covering 375 is effective to reduce a dimension of an unprinted margin 235 on a leading edge 233 of the substrate 231.

16. The method of claim 15, wherein the printing system 100 additionally comprises an impression cylinder having an impression cylinder gap 320 housing a plurality of grippers 350 substantially recessed therein.

17. The method of claim 15, the pressure cylinder 218 having a pressure cylinder gap 330, wherein:

i. the pressure cylinder 218 comprises an angle portion 335 joining a trailing edge 331 of the pressure cylinder gap 330 and an outer circumferential surface 332 of the pressure cylinder 218, and ii. the second cylinder covering 375 overlays the angle portion 335.

18. The method of claim 15, wherein the second cylinder covering 375 overlays a portion of the circumference of the pressure cylinder 218 that is operative to benefit the transfer to substrate 231 of the leading edge 60 of each ink image 50.

19. The method of claim 15, additionally comprising a third cylinder covering 315, disposed around at least a majority of the circumference of the pressure cylinder 218 and interposed between the pressure cylinder 218 and the second cylinder covering 375.

20. A method of installing a margin insert 375 to a printing system 100, the method comprising:

providing the printing system, the printing system comprising:

a. an intermediate transfer member (ITM) 210 comprising a flexible belt operable to have ink images 50 formed thereupon by droplet deposition at an image-forming station 212; and b. an impression station 216 configured for transfer of the ink images 50 to substrate 231 after they are conveyed to the impression station 216 by the ITM 210, the impression station 216 comprising:

i. a rotatable impression cylinder 220 having an impression cylinder gap 320, and ii. a pressure cylinder assembly 318 comprising:

(A) a pressure cylinder 218 having a pressure cylinder gap 330 and operative to rotate synchronously with the impression cylinder 220 and in an opposing direction thereto, the pressure cylinder 218 comprising an angle portion 335 joining a trailing edge 331 of the pressure cylinder gap 330 and an outer circumferential surface 332 of the pressure cylinder 218, (B) a compressible blanket 219 disposed around at least a portion of the circumference of the pressure cylinder 218, and interposing the margin insert 375 between the pressure cylinder 218 and the compressible blanket 219 at least at the angle portion 335, such that a local external geometry of the pressure cylinder assembly 318 at the angle portion 335 is changed by the presence of the interposed margin insert 375, wherein the change in the local external geometry of the pressure cylinder assembly 318 due to the presence of the margin insert 375 is effective to subsequently reduce, during operation of the printing system, a dimension of an unprinted margin 235 on a leading edge 233 of the substrate 231.

21. The method of claim 20, further comprising:

(D) disposing a packing sheet 315 around at least a majority of the circumference of the pressure cylinder 218, such that: the packing sheet is interposed between the pressure cylinder 218 and the compressible blanket 219, and (ii) at least one of a first condition and a second condition is true, wherein the first and second conditions are defined as follows:

according to the first condition, the margin insert 375 is interposed between the packing sheet 315 and the compressible blanket 219; and according to the second condition, the margin insert 375 is interposed between the pressure cylinder 218 and the packing sheet 315.

* * * * *